US 8,916,286 B2

(12) United States Patent
Choi (10) Patent No.: US 8,916,286 B2
(45) Date of Patent: Dec. 23, 2014

(54) BATTERY PACK

(71) Applicant: Samsung SDI Co., Ltd., Yongin-si, Gyeonggi-do (KR)

(72) Inventor: Hong-Keun Choi, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 13/754,879

(22) Filed: Jan. 30, 2013

(65) Prior Publication Data

US 2014/0106202 A1 Apr. 17, 2014

(30) Foreign Application Priority Data

Oct. 11, 2012 (KR) .................. 10-2012-0113025

(51) Int. Cl.
*H01M 2/20* (2006.01)
(52) U.S. Cl.
CPC ................... *H01M 2/202* (2013.01)
USPC ......................... 429/159; 429/160
(58) Field of Classification Search
USPC ............. 429/158, 159, 160, 121, 170, 178
See application file for complete search history.

(56) References Cited

U.S. PATENT DOCUMENTS

| 8,288,035 | B2 * | 10/2012 | Li ................................ 429/151 |
| 2011/0262797 | A1 | 10/2011 | Kim |
| 2012/0094166 | A1 | 4/2012 | Lee et al. |
| 2013/0052515 | A1 * | 2/2013 | Park et al. .................... 429/159 |

FOREIGN PATENT DOCUMENTS

| KR | 2003-0051764 | 6/2003 |
| KR | 10-2009-0042683 A | 4/2009 |
| KR | 10-2011-0030225 | 3/2011 |
| KR | 10-2011-0117586 | 10/2011 |
| WO | WO 02/37589 A2 | 5/2002 |

\* cited by examiner

*Primary Examiner* — Mark F Huff
*Assistant Examiner* — Monique Wills
(74) *Attorney, Agent, or Firm* — Christie, Parker & Hale, LLP (57) ABSTRACT

A battery pack including a bare cell having a first electrode terminal and a second electrode terminal provided on a first surface of the bare cell; a main case having an opening and accommodating the bare cell; a top case that covers the opening of the main case; and a bus-bar connected to each of the first electrode terminal and the second electrode terminal, wherein the bus-bar is provided between the first surface of the bare cell and the top case, and at least one portion of the bus-bar is on a side portion of the main case.

20 Claims, 8 Drawing Sheets

BATTERY PACK

CROSS-REFERENCE TO RELATED APPLICATION

This application claims priority to and the benefit of Korean Patent Application No. 10-2012-0113025, filed on Oct. 11, 2012, in the Korean Intellectual Property Office, the entire content of which is incorporated herein by reference.

BACKGROUND

1. Field

An aspect of the present invention relates to a battery pack.

2. Description of the Related Art

Recently, battery packs have been variously used as power sources of portable electronic devices. As the portable electronic devices are used in an increasing number of fields, demands on battery packs have rapidly increased. Some battery packs can be charged/discharged a plurality of times, and accordingly are economically and environmentally efficient. Thus, the use of the battery packs is encouraged.

As demands on high-output and high-power battery packs in electronic devices increase, a large-capacity battery pack is configured by connecting a plurality of battery packs in series or parallel. Typically, the battery pack is used to supply high voltage, and therefore, the safety of the battery pack is important. In addition, studies on a method for effectively connecting a plurality of battery packs have been conducted in various fields.

SUMMARY

Embodiments provide a battery pack having a new outer case.

Embodiments also provide a battery pack having improved safety even when a plurality of battery packs are used together.

According to an aspect of the present invention, there is provided a battery pack including: a bare cell having first and second electrode terminals provided to a first surface thereof; a main case that has an opening and accommodates the bare cell through the opening; a top case that covers the opening of the main case; and at least one bus-bar connected to each of the first and second electrode terminals, wherein the bus-bar is provided between the first surface of the bare cell and the top case, and at least one portion of the bus-bar is bent to be mounted on a side portion of the main case.

The bus-bar may include a base portion provided in parallel with the first surface of the bare cell so as to be connected to the first or second electrode terminal, and an extending portion bent at the base portion so as to be provided in parallel with the side portion of the main case.

The extending portion may include first and second extending portions respectively connected to one and the other ends of the base portion, and the first and second extending portions may be vertically connected to the base portion so as to be parallel with each other.

The main case may be provided between the first and second extending portions of the bus-bar, and the opening of the main case may face the base portion.

A guide portion that guides the position of the extending portion is provided to the side portion of the main case.

The guide portion may be provided to protrude from the side portion of the main case.

The extending portion of the bus-bar may have a circular section, and the guide portion may be concavely provided corresponding to the extending portion so that the extending portion is mounted on the guide portion.

First and second bending portions may be provided at an end of the extending portion. The first bending portion may be vertically bent in the opposite direction to the side portion of the main case, and the second bending portion may be bent from the first bending portion so as to be parallel with the side portion of the main base.

A holding portion that holds the end of the extending portion may be provided at a bottom end of the side portion of the main case.

The holding portion may include a support surface opposite to the first bending portion and first and second partition walls provided on the support surface, and the first partition wall may be opposite to the second bending portion. The second partition wall may be provided with two second partition walls opposite to each other, and the two second partition walls may be respectively provided at one and the other corners of the first partition wall while being spaced from each other.

The first and second electrode terminals of the bare cell may be provided to protrude from the first surface, and the base portion may be provided with at least one through-hole through which the first or second electrode terminal passes.

The top case may be provided with at least one hole through which gas is exhausted from the bare cell.

First and second ribs protruded toward the first surface of the bare cell may be provided inside the top case, and the first and second ribs may be protruded to different lengths so as to be respectively adjacent to the first and second electrode terminals of the bare cell.

The battery pack may include first and second battery packs, the first and second battery packs may be connected by a connection member, and the connection member may connect the bus-bars provided to the first and second battery packs.

A holding portion that held at least one portion of the bus-bar may be provided at a bottom end of a side portion of each of the first and second battery packs, and the first and second battery packs may be aligned so that the holding portions face each other.

The connection member may include a spacer provided in parallel with the first and second battery packs between the first and second battery packs, and first and second end portions respectively provided at one and the other ends of the spacer.

The holding portion may include a first partition wall spaced from the battery pack so as to be parallel with the battery pack, and a pair of second partition walls respectively provided at one and the other corners of the first partition wall while being spaced part from each other.

Each of the first and second end portions may be provided with at least one partition wall insertion portions having a size corresponding to the first partition wall so that the first partition wall is inserted into the partition wall insertion portion.

A connection tab that electrically connects the bus-bar held by the holding portion may be provided to at least one of the first and second end portions.

The first and second end portions of the connection member may be connected to the holding portions of the first and second battery packs opposite to each other, and the spacer of the connection member may be formed in a rod shape with a predetermined thickness so as to allow the first and second battery packs to be spaced from each other.

As described above, according to the present invention, it is possible to provide a battery pack having a new outer case.

Further, it is possible to provide a battery pack having improved safety even when a plurality of battery packs are used together.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the other element or be indirectly on the other element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements.

Hereinafter, an exemplary embodiment of the present invention will be described in detail with the accompanying drawings.

Figure 1:
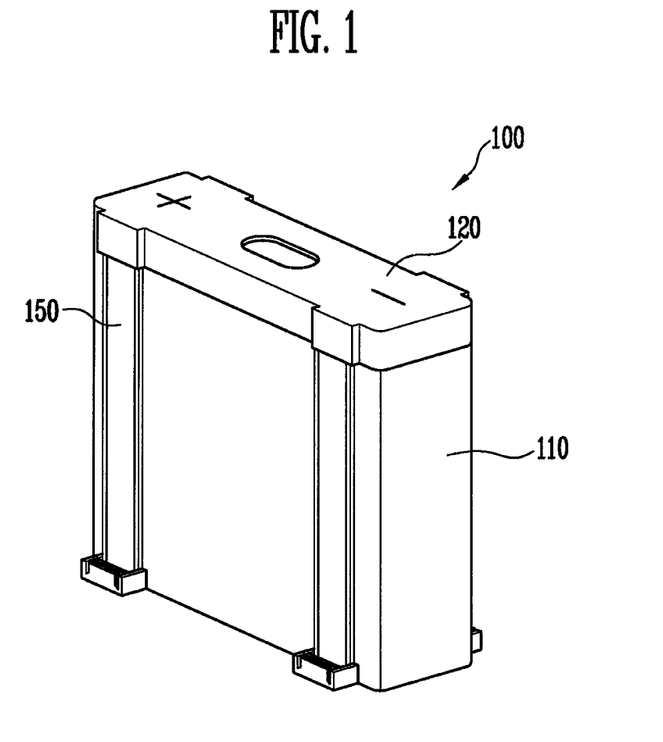
FIG. 1 is a perspective view of a battery pack according to an embodiment of the present invention.
Figure 2:
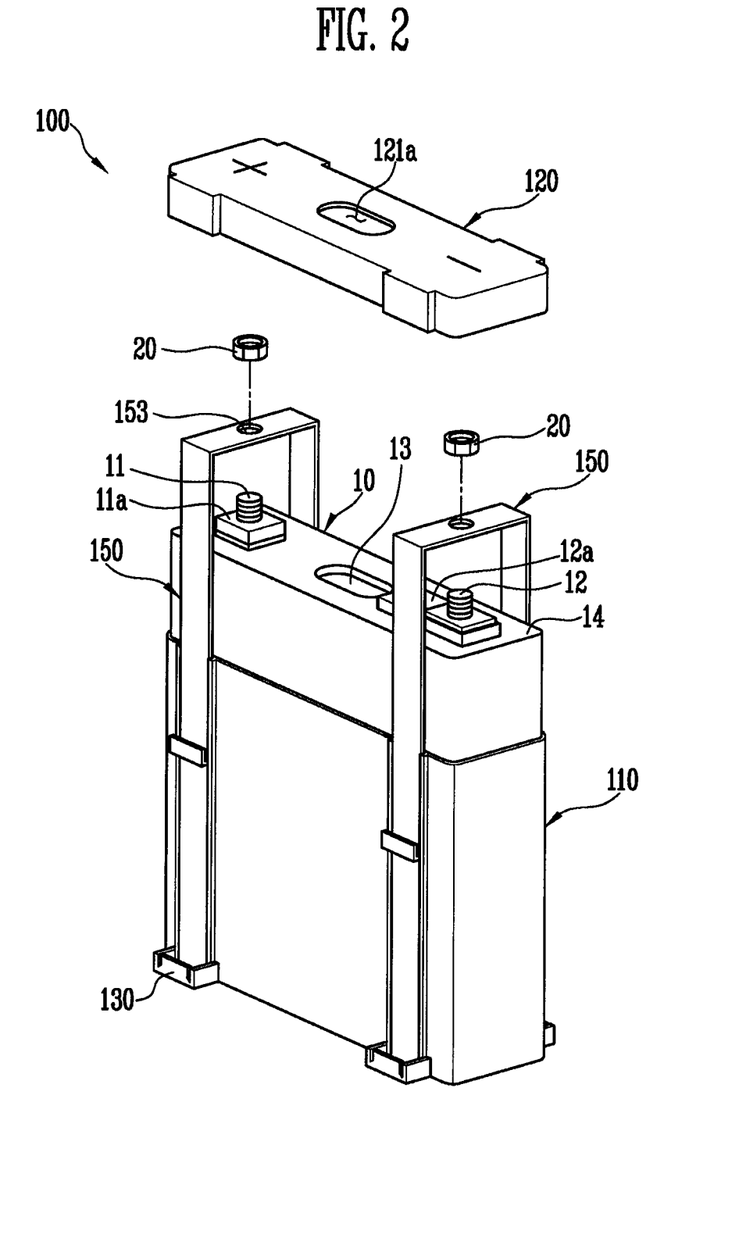
FIG. 2 is an exploded perspective view of the battery pack of FIG. 1.

FIG. 1 is a perspective view of a battery pack according to an embodiment of the present invention. FIG. 2 is an exploded perspective view of the battery pack of FIG. 1.

Referring to FIGS. 1 and 2, the battery pack 100 according to this embodiment includes a bare cell 10 having first and second electrode terminals 11 and 12 provided on a first surface 14; a main case 110 which has an opening 114 and accommodates the bare cell 10 through the opening; a top case 120 that covers the opening of the main case 110; and at least one bus-bar 150 connected to each of the first and second electrode terminals 11 and 12. The bus-bar 150 is provided between the first surface 14 of the bare cell 10 and the top case 120. In this case, at least one portion of the bus-bar 150 may be bent to be mounted on a side portion of the main case 110.

The bare cell 10 may be manufactured by accommodating an electrode assembly and an electrolyte in a battery case and then sealing the battery case with the first surface 14. The first surface 14 may be, for example, a cap assembly, and the first and second terminals 11 and 12 having different polarities and a vent 13 may be provided on the first surface 14. Terminal support portions 11a and 12a may be provided to the first and second electrode terminals 11 and 12, respectively. The terminal support portions 11a and 12a insulate the first and second electrode terminals 11 and 12 from the first surface 14, and simultaneously support the respective first and second electrode terminals 11 and 12. The electrode assembly is electrically connected to the first and second electrode terminals 11 and 12, and energy generated by an electrochemical reaction between the electrode assembly and the electrolyte is provided to the outside of the bare cell 10 through the first and second electrode terminals 11 and 12. The vent 13 acts as a passage through which gas generated in the bare cell 10 is exhausted to the outside of the bare cell 10.

Figure 3A:
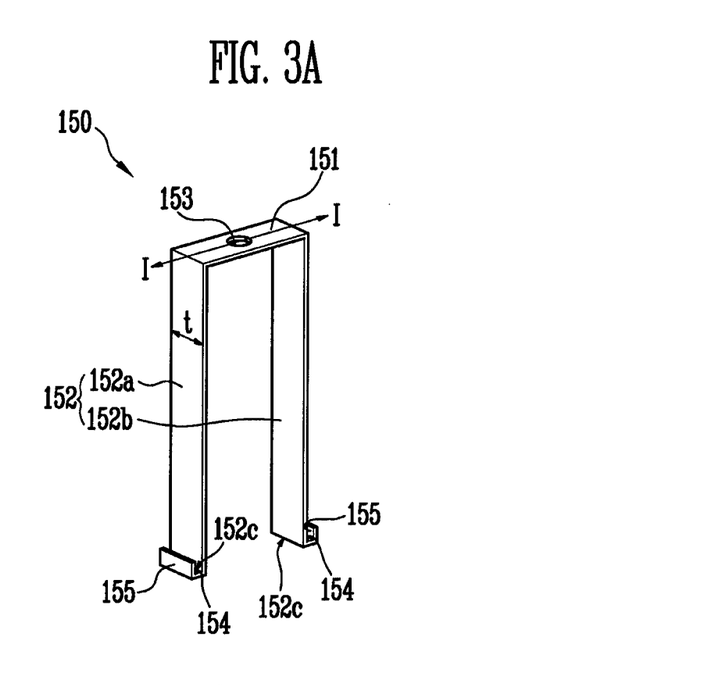
FIG. 3A is a perspective view of a bus-bar of FIG. 2.
Figure 3B:
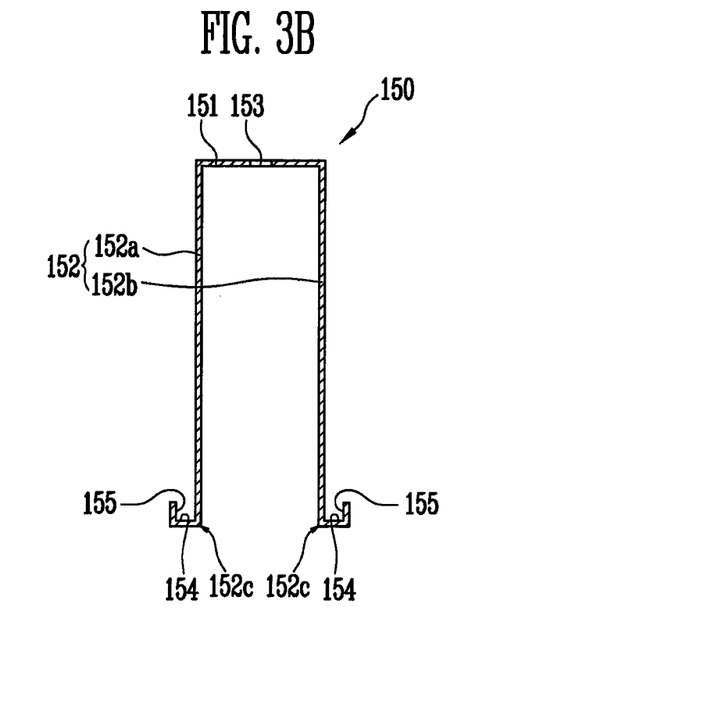
FIG. 3B is a sectional view taken along line I-I of FIG. 3A.
Figure 4:
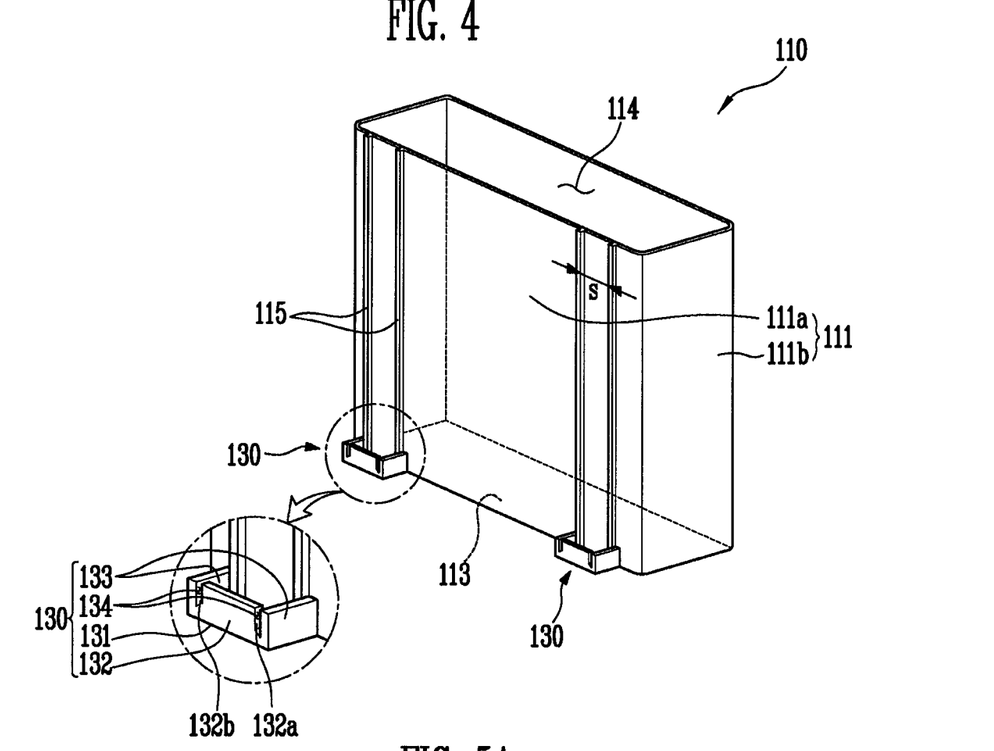
FIG. 4 is a perspective view of a main case of FIG. 2.

FIG. 3A is a perspective view of the bus-bar of FIG. 2. FIG. 3B is a sectional view taken along line I-I of FIG. 3A. FIG. 4 is a perspective view of the main case of FIG. 2.

Referring to FIGS. 3A and 3B together with FIG. 2, the bus-bar 150 may include a base portion 151 provided in parallel with the first surface 14 of the base cell 10 so as to be connected to the first or second electrode terminal 11 or 12, and an extending portion 152 bent at the base portion 151 so as to be provided in parallel with the side portion of the main case 110. The main case 110 may be provided to generally correspond to the shape of the bare cell 10, and the side portion 111 of the main case 110 may include a pair of long side surfaces 111a opposite to each other and a pair of short side surfaces 111b that connect together the long side surfaces 111a. In this embodiment, the bus-bar 150 is provided to contact the long side surface 111a in the side portion 111 of the main case 110. The bus-bar 150 may be modified according to the design of the bare cell 10 and the main case 110, and therefore, the present invention is not limited thereto. The main case 110 may be provided with a bottom surface 113 that connects the long side surfaces 111a and the short side surfaces 111b at the bottom of the main case 110. The opening 114 of the main case 110 may be provided opposite to the bottom surface 113.

The first and second electrode terminals 11 and 12 of the bare cell 10 is provided to protrude from the first surface 14, and the base portion 151 may have at least one through-hole 153 through which the first or second electrode terminal 11 or 12 passes. The extending portion 152 includes first and second extending portions 152a and 152b respectively connected to a respective end of the base portion 151. The extending portion 152 may be connected vertically to the base portion 151 so that the first and second extending portions 152a and 152b are generally parallel to each other. For example, the bus-bar 150 may be provided to have an inverse U-shape, and the main case 110 having the bare cell 10 accommodated therein may be inserted into the bus-bare 150 through a portion opened downward. In this case, the first and second extending portions 152a and 152b of the bus-bar 150 may be slid along the side portion 111 of the main case 110. Thus, the base portion 151 of the bus-bar 150 faces the first surface 14 of the bare cell 10 provided to the opening 114 of the main case 110, so that the first or second electrode terminal 11 or 12 can pass through the through-hole 153 of the base portion 151. The first or second electrode terminal 11 or 12 protruding from the through-hole 153 may be fixed to the bus-bar 150 by a nut 20, etc. The main case 110 is provided between the first and second extending portions 152a and 152b of the bus-bar 150, and the opening 114 of the main case 110 can face the base portion 151.

Guide portions 115 that guide the position of the extending portion 152 may be provided to the side portion 111 of the main case 110. The guide portions 115 may be provided to protrude from the side portion 111 of the main case 110. That is, the guide portions 115 may be provided to protrude in a pair of rod shapes from the side portion 111 of the main case 110, e.g., the long side surface 111a. The guide portions 115 are spaced from each other at a first interval. Here, the first interval may be provided to have a size generally corresponding to the width t of the extending portion 152. The guide portions 115 guide the position of the extending portion 152 so that the insertion process of the bus-bar 150 can be easily performed. Further, the guide portions 115 can stably fix the bus-bar 150 so that the bus-bar 150 is not easily moved by an external force caused by vibration, etc.

A first bending portion 154 and a second bending portion 155 may be provided at an end 152c of the extending portion 152. Here, the first bending portion 154 is vertically bent in the opposite direction to the side portion 111 of the main case 110, and the second bending portion 155 is bent from the first bending portion 154 so as to be substantially parallel with the side portion 111 of the main base 110. For example, the extending portion 152 is provided in parallel with the long side surface 111a in the side portion 111 of the main case 110. The first bending portion 154 is vertically bent in the opposite direction from (i.e., away from) the main case 110 so as to be substantially parallel with the bottom surface 113 of the main case 110, and the second bending portion 115 is vertically bent at the first bending portion 114. For example, the first and second bending portions 154 and 155 and the extending portion 152 may be provided to have a U-shape.

A holding portion 130 that holds the end 152c of the extending portion 152 may be provided at a bottom end of the side portion 111 of the main case 110. In other words, the holding portion 130 may be provided to hold the first and second bending portions 154 and 155 connected to the end 152c of the extending portion 152. The holding portion 130 may include a support surface 131 the faces the first bending portion 154 while supporting the bus-bar 150 at the bottom thereof, and first and second partition walls 132 and 133 provided on the support surface 131. The first partition wall 132 faces the second bending portion 155, and the second partition wall 133 comprises two partition walls. The two second partition walls 133 may be provided to be respectively spaced from edges or corners 132a and 132b of the first partition wall 132. That is, a spacing portion 134 may be provided between the first and second partition walls 132 and 133. An insulation treatment such as coating with an insulation member may be performed on the outer surface of the extending portion 152 of the bus-bar 150 so that it is possible to prevent the bus-bar 150 from being short-circuited.

Figure 5A:
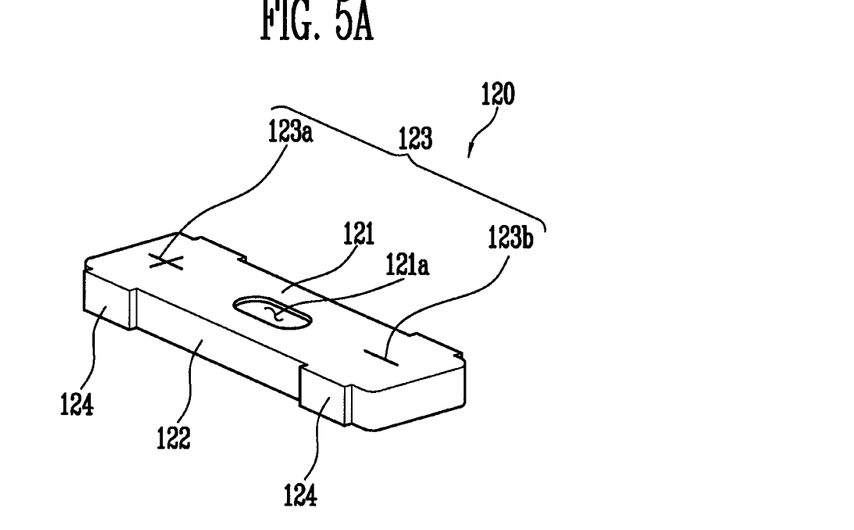
FIG. 5A is a perspective view of a top case of FIG. 2.
Figure 5B:
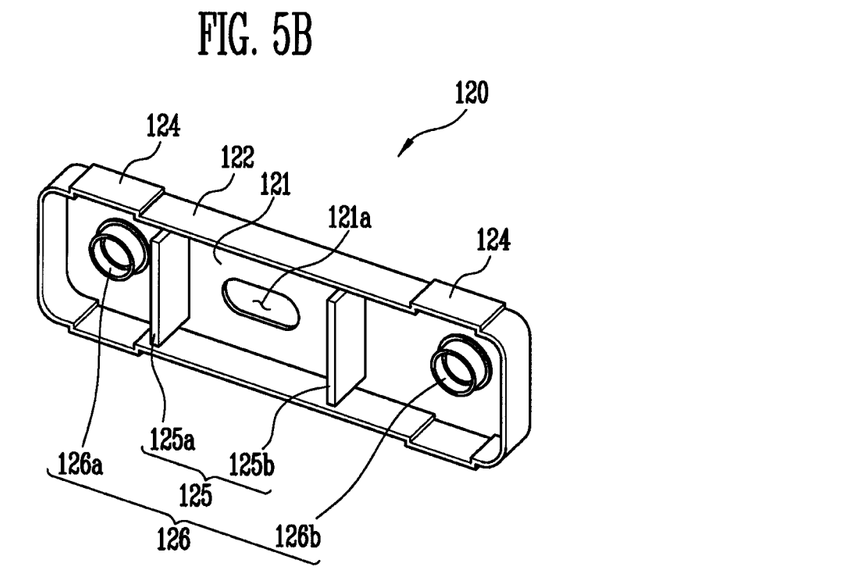
FIG. 5B is a perspective view showing a lower side of the top case of FIG. 5A.

FIG. 5A is a perspective view of the top case of FIG. 2. FIG. 5B is a perspective view showing a lower side of the top case of FIG. 5A.

Referring to FIGS. 5A and 5B together with FIG. 2, at least one hole 121a through the gas generated in the bare cell 10 is exhausted may be formed in the top case 120.

The vent 13 having the gas exhausted therethrough is formed in the first surface 14 of the bare cell 10, and the hole 121a provided at a position generally corresponding to the vent 13 may be formed in the top case 120. Thus, the gas generated in the bare cell 10 can be easily exhausted to the outside of the battery pack through the vent 13 and the hole 121a. The top case 120 may include a first portion 121 that faces the first surface 14 of the bare cell 10 and a second portion 122 (i.e., a skirt) that surrounds an upper side of the main case 120 having the bare cell 10 accommodated therein. In this case, the second portion 122 is provided to generally correspond to the upper side of the main case 120, and may include a step portion 124 protruding to accommodate the shape of the bus-bar 150 connected to the bare cell 10. The hole 121a may be formed in the first portion 121.

At least one rib 125 protruded toward the first surface 14 of the bare cell 10 may be provided inside the top case 120. The rib 125 includes first and second ribs 125a and 125b, and the first and second ribs 125a and 125b may be provided to protrude with different lengths from each other and to be respectively adjacent to the first and second electrode terminals 11 and 12. The terminal support portions 11a and 12a may be provided between the first surface 14 and the first and second electrode terminals 11 and 12. The terminal support portions 11a and 12a may include a first terminal support portion 11a that supports the first electrode terminal 11 and a second terminal support portion 12a that supports the second electrode terminal 12. The first and second terminal support portions 11a and 12a may be provided to have different heights from each other. The first and second ribs 125a and 125b protrude with different lengths so as to respectively correspond to the first and second terminal support portions 11a and 12a, and thus it is possible to prevent the top case 120 from being erroneously inserted.

A terminal insertion portion 126 may be provided inside the top case 120. The terminal insertion portion may include a first terminal insertion portion 126a and a second terminal insertion portion 126b, respectively corresponding to the first and second electrode terminals 11 and 12. One end of the first electrode terminal 11 is inserted into the first terminal insertion portion 126a, and one end of the second electrode terminal 11 is inserted into the second terminal insertion portion 126b. A terminal mark 123 may be provided to an outer surface of the top case 120. The terminal mark 123 may include a first terminal mark 123a and a second terminal mark 123b, respectively corresponding to the first and second terminal insertion portions 126a and 126b. The first terminal mark 123a specifies the position of the first electrode terminal 11, and the second terminal mark 123b specifies the position of the second electrode terminal 12. The positions of the first and second electrode terminals 11 and 12 can be confirmed at the outside of the top case 120 by the first and second terminal marks 123a and 123b and the first and second terminal insertion portions 126a and 126b, so that the battery pack can be easily connected to an external electronic device.

The battery pack according to this embodiment is provided with a new bus-bar for stably accommodating a bare cell and electrically connecting the bare cell to the external electronic device, so that a high-capacity bare cell can be stably used. Further, the battery pack allows the exterior appearance of the bare cell to be aesthetically pleasing and facilitates processes, so that it is possible to reduce a failure rate and to improve process efficiency. Furthermore, the battery pack enables the first and second electrode terminals to be appropriately connected to the external electronic device.

Hereinafter, other embodiments of the present invention will be described with reference to FIGS. 6A to 10. Contents of these embodiments, except the following contents, are similar to those of the embodiment described with reference to FIGS. 1 to 5B, and therefore, their detailed descriptions will be omitted.

Figure 6A:
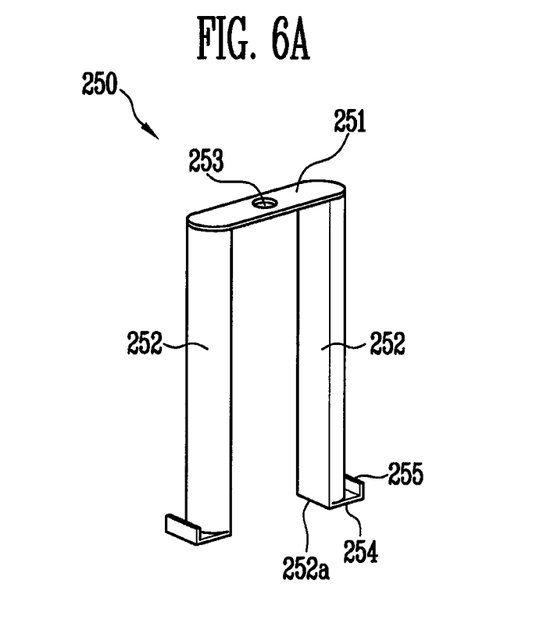
FIG. 6A is a perspective view of a bus-bar according to another embodiment of the present invention.
Figure 6B:
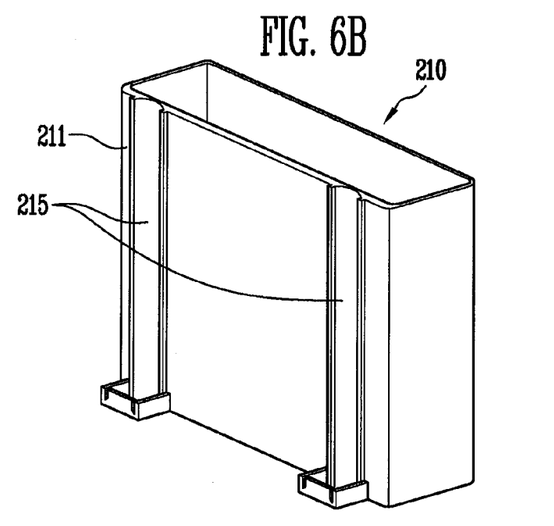
FIG. 6B is a perspective view of a main case according to another embodiment of the present invention.

FIG. 6A is a perspective view of a bus-bar according to another embodiment of the present invention. FIG. 6B is a perspective view of a main case according to another embodiment of the present invention.

Referring to FIGS. 6A and 6B, the bus-bar 250 according to this embodiment may include a base portion 251 connected to the first and second electrode terminals provided to the first surface of the bare cell while being parallel with the first surface of the bare cell, and extending portions 252 vertically connected to the base portion 251 at respective ends of the base portion 251. Guide portions 215 that guide the position of the extending portions 252 may be provided to a side portion 211 of a main case 210. The extending portion 252 of the bus-bar 250 may have a circular or arc section, and the guide portion 215 may be concavely provided corresponding to the extending portion 252 so that the extending portion 252 is mounted on the guide portion 251. The section of the extending portion 252 is circular, and the extending portion 252 is mounted on the guide portion 215. In this case, the extending portion 252 is easily slid along the guide portion 215, and thus the main case 210 can be smoothly inserted into the bus-bar 250. Since the section of the extending portion 252 of the bus-bar 250 is circular, there is no burden on correct alignment of the base portion 251 and the extending portion 252 when the bus-bar 250 is manufactured. Thus, the failure rate of the bus-bar 250 can be reduced.

Figure 7:
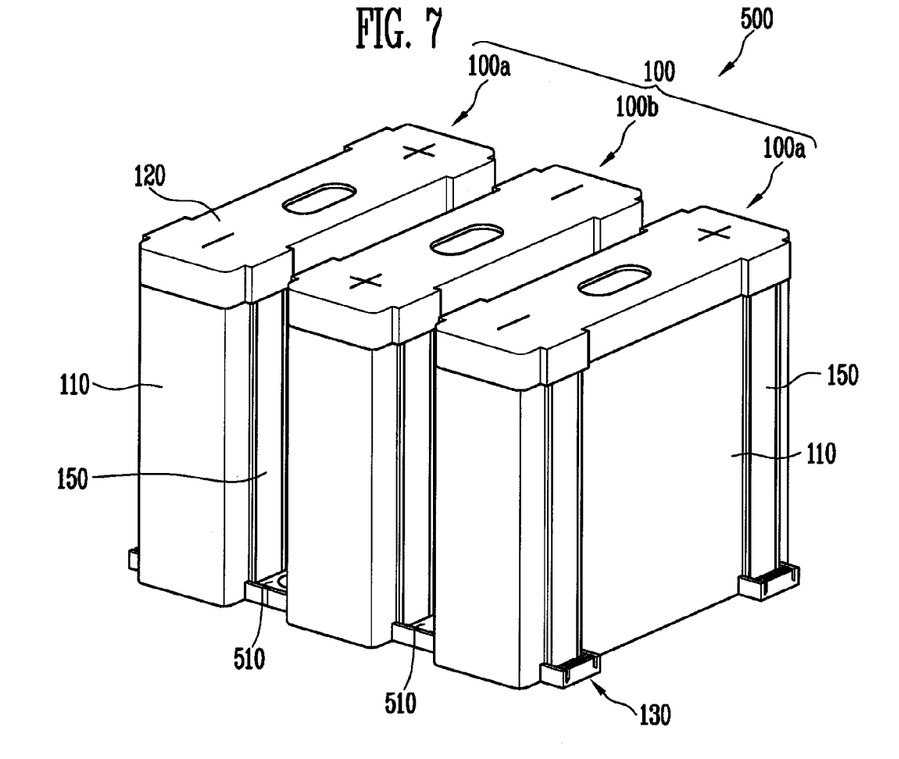
FIG. 7 is a perspective view showing a plurality of battery packs according to still another embodiment of the present invention.
Figure 8:
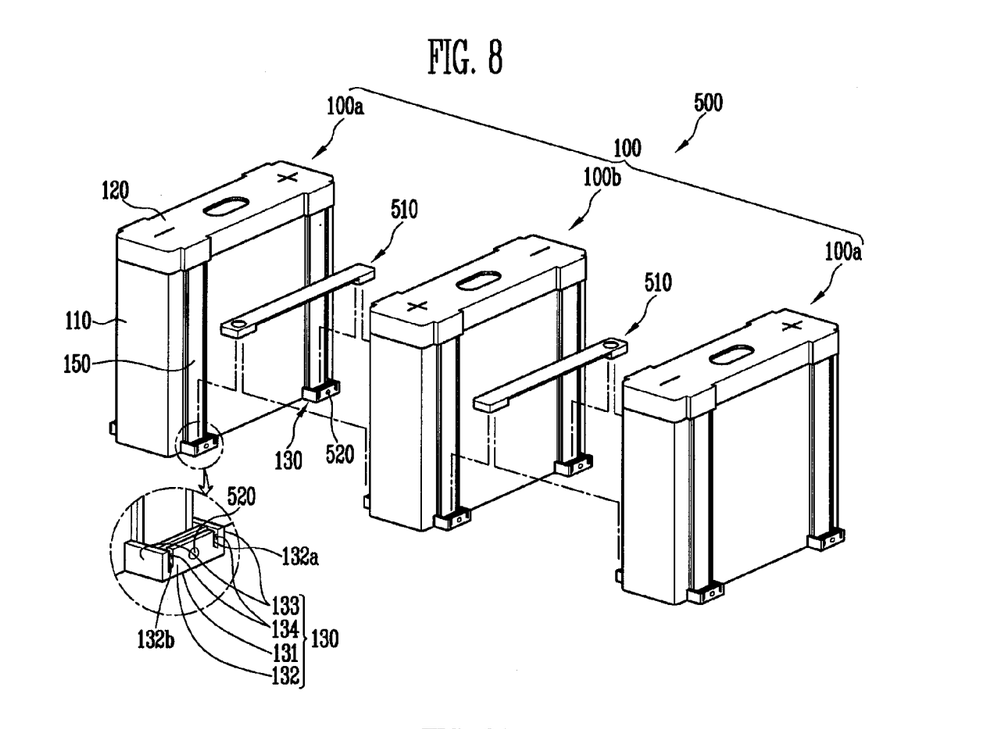
FIG. 8 is an exploded perspective view of FIG. 7.

FIG. 7 is a perspective view showing a plurality of battery packs according to still another embodiment of the present invention. FIG. 8 is an exploded perspective view of FIG. 7.

Referring to FIGS. 7 and 8, the battery pack 100 is configured with a plurality of battery packs, and includes first and second battery packs 100a and 100b adjacent to each other. The first and second battery packs 100a and 100b are electrically connected by a connection member 510, and the connection member 510 connects bus-bars 150 provided to the first and second battery packs 100a and 100b. Two bus-bars 150 may be provided to each battery pack 100. In this case, the two bus-bars 150 may be connected to respective the first and second electrode terminals provided to the bare cell. For example, the first and second electrode terminals may be positive and negative electrode terminals, respectively. Therefore, the bus-bar 150 connected to the first electrode terminal may have a positive polarity, and the bus-bar 150 connected to the second electrode terminal may have a negative polarity.

A holding portion 130 that holds at least one portion of the bus-bar 150 is provided at the bottom end of a side portion 111 of each of the first and second battery packs 100a and 100b, and the first and second battery packs 100a and 100b may be aligned so that the holding portions 130 of the first and second battery packs 100a and 100b face each other. The first and second battery packs 100a and 100b may be aligned so that the bus-bars 150 having the same polarity face each other. Therefore, the first and second battery packs 100a and 100b may be connected in parallel by the connection member 510. Alternatively, the first and second battery packs 100a and 100b may be aligned so that the bus-bars 150 having different polarities face each other. Therefore, the first and second battery packs 100a and 100b may be connected in series by the connection member 510. Although it has been illustrated in this embodiment that the first and second battery packs 100a and 100b are connected in series, the present invention is not limited thereto.

Figure 9A:
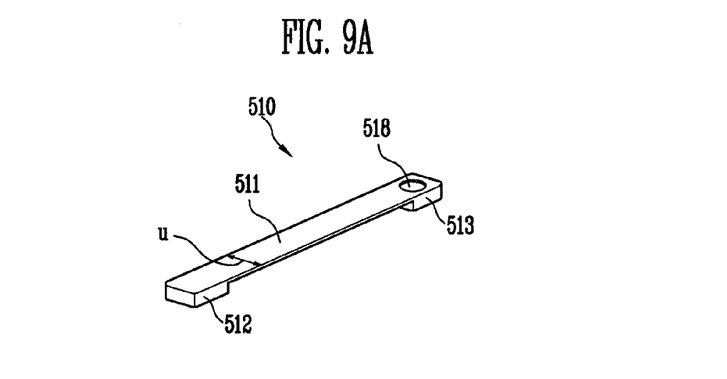
FIG. 9A is a perspective view of a connection member of FIG. 8.
Figures 9B, 10:
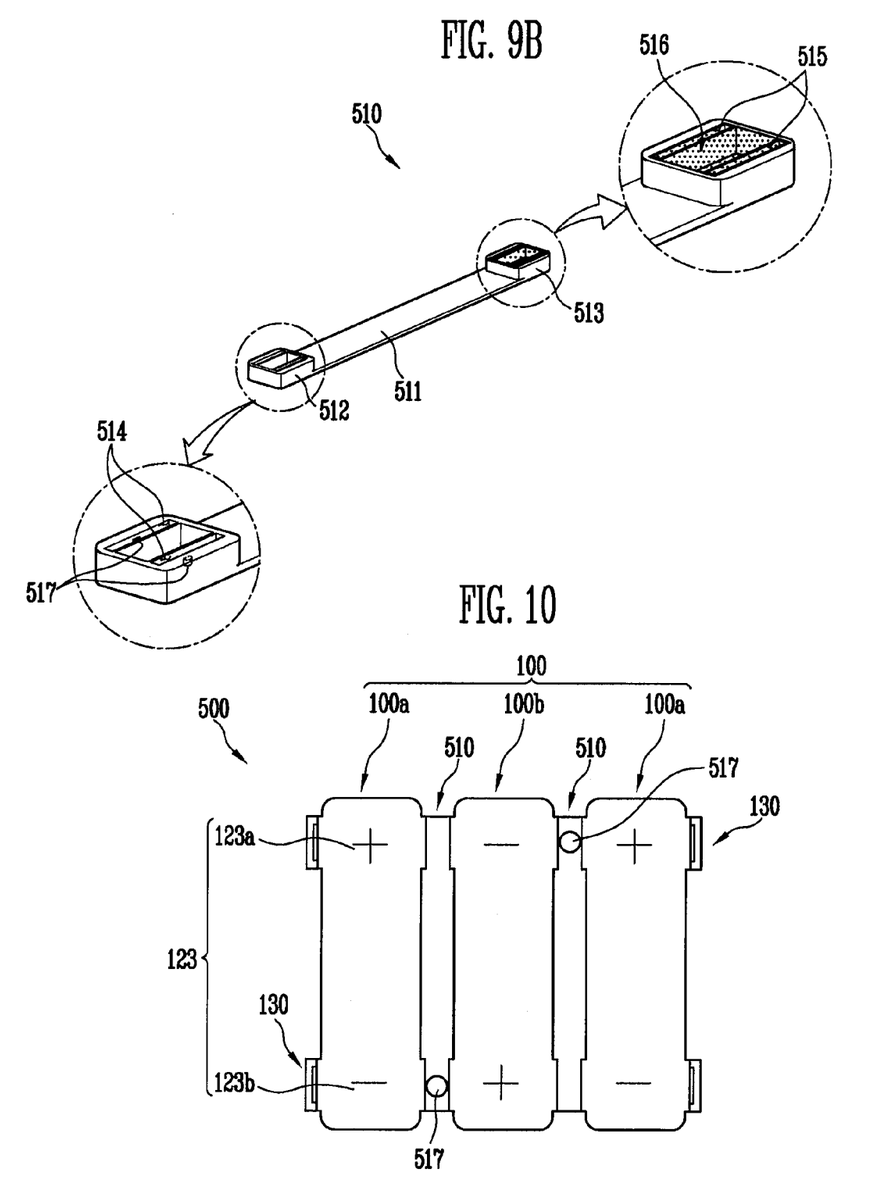
FIG. 9B is a perspective view showing a lower side of the connection member of FIG. 9A.
FIG. 10 is a front view showing an upper side of FIG. 7.

FIG. 9A is a perspective view of the connection member of FIG. 8. FIG. 9B is a perspective view showing a lower side of the connection member of FIG. 9A. FIG. 10 is a front view showing an upper side of FIG. 7.

Referring to FIGS. 9A and 9B, the connection member 510 may include a spacer 511 provided in parallel with the first and second battery packs 100a and 100b between the first and second battery packs 100a and 100b, and first and second end portions 512 and 513 respectively provided at one and the other ends of the spacer 511. The first and second end portions 512 and 513 of the connection member 510 are connected to the holding portions 130 of the first and second battery packs 100a and 100b opposite to each other, and the spacer 511 of the connection member 510 may be formed in a rod shape with a predetermined thickness u so as to allow the first and second battery packs 100a and 100b to be spaced from each other. The first and second battery packs 100a and 100b are spaced from each other by the thickness u of the spacer 511, so that it is possible to prevent a short circuit due to a contact of the bus-bar 150, etc., and to constantly maintain the alignment of the battery packs 100.

The holding portion 130 may include a first partition wall 132 provided in parallel with the battery pack 100 while being spaced from the battery pack 100, and a pair of second partition walls 133 respectively provided at one and the other corners of the first partition wall 132 while being spaced from each other. A spacing portion 134 may be provided between the first and second partition walls 132 and 133.

The first or second end portion 512 or 513 may be provided with at least one partition wall insertion portions 514 or 515 having a size generally corresponding to the first partition wall 132 so that the first partition wall 132 is inserted into the partition wall insertion portion 514 or 515. The first partition wall 132 may be connected to the first or second end portion 512 and 513 by being inserted into the partition wall insertion portion 514 or 515 provided with the first or second end portion 512 and 513. In this case, at least one portion of the first or second end portion 512 and 513 may be provided to the spacing portion 134. A first fastening portion 520 is provided to the holding portion 130 of the main case 110, and a second fastening portion 517 fastened to the first fastening portion 520 may be further provided to at least one of the first and second end portions 512 and 513. For example, the first and second fastening portions 520 and 517 may be fastened through hook coupling or groove-projection coupling. The first and second fastening portions 520 and 517 enables the first and second battery packs 100a and 100b to be firmly coupled to each other.

A connection tab 516 that electrically connects the bus-bar 150 held by the holding portion 130 may be provided to at least one of the first and second end portions 512 and 513. An align mark 518 may be provided to an outer surface of one of the first and second end portions 512 and 513, to which the connection tab 516 is provided. When the connection tab 516 is provided to only one of the first and second end portions 512 and 513, e.g., the second end portion 513, only physical coupling exists at the portion at which the first and second battery packs are connected through the first end portion 512, and physical coupling and electrical coupling exist together at the portion at which the first and second battery packs are connected through the second end portion 513. Accordingly, the first and second end portions 512 and 513 can be distinguished by the align mark 518 provided to the second end portion 513.

Referring to FIG. 10, in the battery pack 100 according to this embodiment, the first and second battery packs 100a and 100b may be connected in series so that the bus-bars having different polarities face each other. In the battery pack according to this embodiment, the number and electrical connection state of the battery packs may be variously modified. Thus, the battery pack according to this embodiment can be effectively applied to external electronic devices having various voltages and exterior appearances. Further, since the manufacturing process of the battery pack is easily performed, the failure rate of the battery pack is reduced, thereby improving process efficiency.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A battery pack, comprising:
   a bare cell having a first electrode terminal and a second electrode terminal provided on a first surface of the bare cell, and a second surface opposite to the first surface;
   a main case having an opening and accommodating the bare cell;
   a top case that covers the opening of the main case; and
   a bus-bar connected to each of the first electrode terminal and the second electrode terminal, wherein the bus-bar is provided between the first surface of the bare cell and the top case, and wherein at least one portion of the bus-bar is on a side portion of the main case and extends from the first surface of the bare cell toward the second surface.

2. The battery pack according to claim 1, wherein the bus-bar includes a base portion extending generally parallel to the first surface of the bare cell and connected to the first electrode terminal or the second electrode terminal, and an extending portion bent from the base portion and extending generally parallel to the side portion of the main case.

3. The battery pack according to claim 2, wherein the extending portion includes a first extending portion and a second extending portion respectively connected to a first end portion and a second end portion of the base portion, wherein the first extending-portion and the second extending portion extend generally parallel to each other.

4. The battery pack according to claim 2, wherein the main case is located between the first extending portion and the second extending portion of the bus-bar, and the opening of the main case faces the base portion.

5. The battery pack according to claim 2, wherein a guide portion is on the side portion of the main case.

6. The battery pack according to claim 5, wherein the guide portion protrudes from the side portion of the main case.

7. The battery pack according to claim 5, wherein the extending portion of the bus-bar has a circular section, and wherein the guide portion is concave and generally corresponds to the extending portion so that the extending portion can be mounted on the guide portion.

8. The battery pack according to claim 2, wherein a first bending portion and a second bending portion are located at an end of the extending portion, wherein the first bending portion is bent to extend in a direction away from the side portion of the main case, and wherein the second bending portion is bent from the first bending portion to extend generally parallel to the side portion of the main base.

9. The battery pack according to claim 8, wherein a holding portion that holds the end of the extending portion is provided at an end of the side portion of the main case.

10. The battery pack according to claim 9, wherein the holding portion includes a support surface opposite to the first bending portion and a first partition wall and a second partition wall on the support surface, the first partition wall being opposite to the second bending portion, the second partition wall comprising two second partition walls opposite to each other, wherein the two second partition walls are located at corners of the first partition wall and are spaced from each other.

11. The battery pack according to claim 2, wherein the first electrode terminal and the second electrode terminal of the bare cell protrude from the first surface, and wherein the base portion has at least one through-hole through which the first electrode terminal or the second electrode terminal passes.

12. The battery pack according to claim 1, wherein the top case has at least one hole configured to allow gas to be exhausted from the bare cell.

13. The battery pack according to claim 1, wherein a first rib and a second rib are inside the top case and protrude toward the first surface of the bare cell, wherein the first rib and the second rib protrude to different lengths so as to be adjacent to the first electrode terminal and the second electrode terminal, respectively, of the bare cell.

14. The battery pack according to claim 1, wherein the battery pack includes a first battery pack and a second battery pack, the first battery pack and the second battery pack being connected by a connection member, wherein the connection member connects the bus-bars provided to the first battery pack and the second battery pack.

15. The battery pack according to claim 14, wherein a holding portion holding at least a portion of the bus-bar is located at an end of a side portion of each of the first battery pack and the second battery pack, and the first battery pack and the second battery pack are aligned so that respective holding portions face each other.

16. A battery pack, comprising:
   a bare cell having a first electrode terminal and a second electrode terminal provided on a first surface of the bare cell;
   a main case having an opening and accommodating the bare cell;
   a top case that covers the opening of the main case; and
   a bus-bar connected to each of the first electrode terminal and the second electrode terminal, wherein the bus-bar is provided between the first surface of the bare cell and the top case, and at least one portion of the bus-bar is on a side portion of the main case, and
   wherein the battery pack includes a first battery pack and a second battery pack, the first battery pack and the second battery pack being connected by a connection member, wherein the connection member connects the bus-bars provided to the first battery pack and the second battery pack and comprises a spacer extending generally parallel to and between the first battery pack and the second battery pack, the spacer having a first end portion and a second end portion.

17. The battery pack according to claim 15, wherein the holding portion includes a first partition wall spaced from and extending generally parallel to the battery pack, and a pair of second partition walls located at respective corners of the first partition wall and being spaced from each other.

18. The battery pack according to claim 17, wherein each of the first end portion and the second end portion have at least one partition wall insertion portion sized to generally correspond to the first partition wall so that the first partition wall can be inserted into the partition wall insertion portion.

19. The battery pack according to claim 16, wherein a connection tab that electrically connects the bus-bar held by a holding portion is on at least one of the first end portion and the second end portion.

20. The battery pack according to claim 16, wherein the first end portion and the second end portion of the connection member are respectively connected to a holding portion of the first battery pack and the second battery pack opposite to each other, and wherein the spacer of the connection member is a rod spacing the first battery pack from the second battery pack.

* * * * *